(12) United States Patent
Modawell et al.

(10) Patent No.: US 9,914,046 B2
(45) Date of Patent: Mar. 13, 2018

(54) SYSTEM, DEVICE, PRODUCT AND METHOD FOR DISTRIBUTED PRODUCTION OF LOTTERY TICKETS

(71) Applicant: IGT Global Solutions Corporation, Providence, RI (US)

(72) Inventors: Richard A. Modawell, Lakeland, FL (US); Thomas K. Oram, Hudson, MA (US); Donald L. Stanford, Pawtucket, RI (US); Mark Truman, East Greenwich, RI (US)

(73) Assignee: IGT Global Solutions Corporation, Providence, RI (US)

( * ) Notice: Subject to any disclaimer, the term of this patent is extended or adjusted under 35 U.S.C. 154(b) by 3 days.

(21) Appl. No.: 15/112,480

(22) PCT Filed: Feb. 23, 2016

(86) PCT No.: PCT/US2016/019133
§ 371 (c)(1),
(2) Date: Jul. 19, 2016

(87) PCT Pub. No.: WO2016/137996
PCT Pub. Date: Sep. 1, 2016

(65) Prior Publication Data
US 2017/0007916 A1 Jan. 12, 2017

Related U.S. Application Data

(60) Provisional application No. 62/119,931, filed on Feb. 24, 2015, provisional application No. 62/166,316, (Continued)

(51) Int. Cl.
*A63B 71/00* (2006.01)
*A63F 3/06* (2006.01)
(Continued)

(52) U.S. Cl.
CPC .......... *A63F 3/0665* (2013.01); *A63F 3/0655* (2013.01); *B41F 5/24* (2013.01);
(Continued)

(58) Field of Classification Search
CPC ..................................................... A63B 71/00
(Continued)

(56) References Cited

U.S. PATENT DOCUMENTS 4,643,454 A    2/1987  Ondis
4,982,337 A *  1/1991  Burr ...................... G06Q 50/34
                                                              221/7

(Continued)

FOREIGN PATENT DOCUMENTS

EP    1988512    11/2008
EP    1427492    7/2011
(Continued)

OTHER PUBLICATIONS

International Search Report and Written Opinion for PCT/US2106/019133, USPTO, dated Nov. 5, 2016.

*Primary Examiner* — John E Simms, Jr.
*Assistant Examiner* — Dolores Collins
(74) *Attorney, Agent, or Firm* — Williams Mullen PC; Thomas F. Bergert

(57) ABSTRACT

A system, device and method provide for the printing of an instant, scratch-off lottery ticket product on demand at a retail location. In various embodiments, a pre-activation printing process applies an active thermal layer and other coatings on a ticket substrate, but excludes any game indicia or security codes. An activator printer thermally applies game indicia and/or security code(s) at a retail location according to ticket selections made by a user and further according to data generated via a central host, wherein the activator printer applies the indicia and code(s) at least (Continued)

partially under one or more security coatings on the ticket substrate, where the coatings had been applied during the pre-activation process.

19 Claims, 10 Drawing Sheets

Related U.S. Application Data filed on May 26, 2015, provisional application No. 62/239,334, filed on Oct. 9, 2014.

(51) Int. Cl.
| | |
|---|---|
| *B42D 15/00* | (2006.01) |
| *B41F 5/24* | (2006.01) |
| *C09D 1/00* | (2006.01) |
| *B41M 3/00* | (2006.01) |
| *A63F 9/24* | (2006.01) |

(52) U.S. Cl.
CPC ............ *B42D 15/00* (2013.01); *C09D 1/00* (2013.01); *A63F 2009/2435* (2013.01); *B41M 3/005* (2013.01)

(58) Field of Classification Search
USPC .......................................................... 273/139
See application file for complete search history.

(56) References Cited

U.S. PATENT DOCUMENTS

| | | | |
|---|---|---|---|
| 5,213,664 A * | 5/1993 | Hansell | D21H 21/40 162/134 |
| 5,222,624 A * | 6/1993 | Burr | G07C 15/005 221/1 |
| 5,709,976 A | 1/1998 | Malhotra | |
| 5,772,510 A * | 6/1998 | Roberts | A63F 3/0665 273/138.2 |
| 5,941,771 A | 8/1999 | Haste, III | |
| 6,053,405 A * | 4/2000 | Irwin, Jr. | A63F 3/0665 235/375 |
| 6,142,533 A * | 11/2000 | Borowski, Jr. | A63F 3/0665 283/111 |
| 6,543,808 B1 | 4/2003 | Mitchell, Jr. et al. | |
| 6,565,006 B1 | 5/2003 | Hall | |
| 6,648,755 B1 * | 11/2003 | Luciano, Jr. | G07F 17/42 283/101 |
| 6,899,621 B2 | 5/2005 | Behn et al. | |
| 6,899,622 B2 | 5/2005 | Lind et al. | |
| 6,958,014 B1 * | 10/2005 | Luciano, Jr. | G07F 17/42 283/101 |
| 6,991,541 B2 | 1/2006 | Lind et al. | |
| 7,090,578 B2 | 8/2006 | Anderson | |
| 7,590,950 B2 | 9/2009 | Collins et al. | |
| 7,621,810 B2 | 11/2009 | Gilmore et al. | |
| 7,625,279 B1 * | 12/2009 | Luciano, Jr. | G07F 17/42 273/138.1 |
| 7,758,413 B2 * | 7/2010 | Luciano, Jr. | G07F 17/42 273/138.1 |
| 7,771,277 B2 | 8/2010 | Chamberlain et al. | |
| 7,843,596 B2 | 11/2010 | Silverbrook et al. | |
| 7,905,986 B2 * | 3/2011 | Hladik | B41M 5/52 162/135 |
| 7,985,129 B2 | 7/2011 | Okuniewicz | |
| 8,025,211 B2 | 9/2011 | Ossandon-Marzolo | |
| 8,074,570 B2 * | 12/2011 | Grotkowski | A63F 3/065 101/450.1 |
| 8,202,164 B2 | 6/2012 | Lechner et al. | |
| 8,206,207 B2 | 6/2012 | Breslo | |
| 8,272,959 B2 | 9/2012 | Yacenda | |
| 8,314,823 B2 | 11/2012 | Gunabalan et al. | |
| 8,403,742 B2 | 3/2013 | Desai | |
| 8,449,373 B2 * | 5/2013 | Luciano, Jr. | G07F 17/42 273/138.1 |
| 8,529,330 B2 * | 9/2013 | Luciano, Jr. | G07F 17/42 283/903 |
| 8,628,413 B2 | 1/2014 | LeMay et al. | |
| 8,678,920 B2 | 3/2014 | Yacenda | |
| 8,821,246 B2 | 9/2014 | Okuniewicz | |
| 8,974,285 B2 * | 3/2015 | Roper | G07F 17/32 463/19 |
| 9,076,161 B2 | 7/2015 | Landers | |
| 2001/0003100 A1 | 6/2001 | Yacenda | |
| 2002/0151340 A1 | 10/2002 | Guinn et al. | |
| 2003/0050109 A1 | 3/2003 | Caro et al. | |
| 2003/0137143 A1 | 7/2003 | Itkis et al. | |
| 2003/0186734 A1 | 10/2003 | LeMay et al. | |
| 2003/0236749 A1 | 12/2003 | Shergalis | |
| 2004/0006487 A1 | 1/2004 | Tari | |
| 2004/0033095 A1 | 2/2004 | Saffari et al. | |
| 2004/0157046 A1 | 8/2004 | Becker | |
| 2004/0242309 A1 | 12/2004 | Melesko et al. | |
| 2005/0181859 A1 | 8/2005 | Lind et al. | |
| 2006/0160602 A1 | 7/2006 | Blythe et al. | |
| 2006/0293783 A1 | 12/2006 | Hand et al. | |
| 2008/0197621 A1 * | 8/2008 | Grotkowski | A63F 3/065 283/94 |
| 2009/0163263 A1 | 6/2009 | Herndon et al. | |
| 2009/0227320 A1 | 9/2009 | McBride | |
| 2010/0218693 A1 | 9/2010 | Kozdras | |
| 2010/0253063 A1 * | 10/2010 | Skogster | A63F 3/0665 283/100 |
| 2011/0028199 A1 * | 2/2011 | Luciano, Jr. | G07F 17/42 463/17 |
| 2011/0272934 A1 | 11/2011 | Lundgren et al. | |
| 2012/0149561 A1 | 6/2012 | Ribi et al. | |
| 2012/0214582 A1 | 8/2012 | Marek | |
| 2013/0112744 A1 | 5/2013 | Landers | |
| 2014/0148235 A1 | 5/2014 | Luciano et al. | |
| 2015/0018206 A1 | 1/2015 | Scheuer | |
| 2015/0072749 A1 * | 3/2015 | Elkhoury | G07F 17/329 463/17 |
| 2015/0234620 A1 | 8/2015 | Terashima et al. | |
| 2015/0243122 A1 | 8/2015 | Saffari et al. | |
| 2015/0248806 A1 | 9/2015 | Mueller | |
| 2015/0279156 A1 | 10/2015 | Omar | |

FOREIGN PATENT DOCUMENTS

| | | |
|---|---|---|
| WO | 02011084 | 2/2002 |
| WO | 03022380 | 3/2003 |
| WO | 03049827 | 6/2003 |
| WO | 2004021290 | 3/2004 |
| WO | 2005050470 | 6/2005 |
| WO | 2005097281 | 10/2005 |
| WO | 2006076750 | 7/2006 |
| WO | 2009081323 | 7/2009 |
| WO | 2012002810 | 1/2012 |
| WO | 2015033176 | 3/2015 |

* cited by examiner

SYSTEM, DEVICE, PRODUCT AND METHOD FOR DISTRIBUTED PRODUCTION OF LOTTERY TICKETS

FIELD OF THE INVENTION

The present invention pertains to lottery-related transaction devices, products, methods and systems, and more particularly to a system, device, product and method for distributed printing of lottery tickets.

BACKGROUND ART

Past and modern lottery and gaming systems are beset with security-related and other challenges. In a typical lottery purchase and redemption transaction, a lottery ticket is purchased at a point-of-sale or kiosk station of a participating retailer. Playslips may be involved for those players selecting numbers for a lottery drawing. If the ticket is an instant ticket, it is typically played by scratching the surface or using other means to determine if it is a winner.

With instant tickets, rolls of tickets are traditionally printed and manufactured in central facilities, and then distributed to retail locations. The tickets can be distributed to customers through ticket vending machines, which can be operated by retail clerks or as self-service kiosks. Such devices must be re-stocked with tickets when bins or rolls become empty, and delays in re-stocking popular games can lead to player frustration and lost revenue. Gaming with traditional physical tickets also exposes lottery operators and system providers to losses due to theft of tickets and fraud. For example, an unscrupulous retail clerk may attempt to locate and secure winning instant tickets while leaving losing tickets for the public to purchase. This risk occurs, in part, because security features must be printed on the tickets prior to retail distribution. Additionally, by using fully pre-printed tickets, there is no opportunity for players to add customization features to their purchased tickets, or share aspects of their entertaining purchase with others. Further, complications with inks, ticket compositions, game data and security features have made it extremely difficult to effectuate local ordering and printing of lottery tickets.

DISCLOSURE OF INVENTION EMBODIMENTS

The present invention provides a solution to the above problems and more. In various aspects, the present invention provides a distributed ticket producing system, product and method whereby a lottery system provider (LSP) such as IGT Global Solutions Corporation, for example, can generate incomplete instant lottery tickets and electronically distribute those incomplete tickets to a vending device at a retail location, where the vending device is either operated by a retail clerk or provided as part of a self-service machine. It will be appreciated that the term "vending device" can reflect a broad range of devices that need not necessarily process currency transactions, and can be, for example, a physical device in a retail environment capable of receiving un-activated tickets and issuing activated tickets in accordance with the present disclosure. Completed tickets and content can be generated on the fly and in response to inputs from players at the vending device, including player-selected game options and customization options. The tickets can include elements directly related to game play as well as elements not related to game play, such as customization elements, which may include decorative and/or personalization features that create a unique ticket, for example. In various embodiments, player input is transmitted by the vending device to a remote central host, which processes the input and responds to the vending device with appropriate printing instructions. Once received by the vending device, an activator printer associated with the vending device applies the appropriate ticket features on an un-activated or "pre-activated" ticket substrate having pre-determined elements thereon. The vending device then dispenses the completed ticket for the player. In various aspects, the ticket can be customized by interactions between the customer and the vending device at the point-of-purchase, and such customizations can be printed by the activator printer component of the vending device, either pursuant to instructions from the device or from the central host. For instance, the customer can select any of: vending device functions to generate a personalized message to be displayed on the ticket; game options; color; typeface; copy; graphics; or a selection that directs the vending device to employ a camera in communication therewith to take a photograph of the customer, wherein the photograph can then be printed onto the ticket. The customer can further provide a previously established code representing customization features that can be transmitted to and/or read by the vending device in order to customize the ticket as desired. Additionally, in various embodiments, anti-counterfeiting measures can be applied to the tickets to provide a mechanism for later verification of the authenticity of each ticket for a given game.

In various embodiments, the customer can, via the vending device, save an image of the ticket, generate a video or otherwise create related content and post the related content via social media (e.g., Facebook™, Twitter™). For example, a customer may publish the message "I just created a custom lottery ticket for John Smith". The customer can also publish the related content via electronic mail and other means, and can further create a message, video, picture or other content for retention and publication via the vending device. For example, the user may publish a video message for the next player using the vending device to view. In various embodiments, the vending device includes a payment processing component, a user interface, an activation printer component and a camera component.

In various embodiments, the host can generate the ticket content in the form of background art, game theme(s), game indicia, player indicia, areas for applying suitable security (e.g., scratch-off) material, and areas for applying a player's marking system for games such as Bingo and Keno, for example.

MODES FOR CARRYING OUT THE INVENTION EMBODIMENTS

Figure 1:
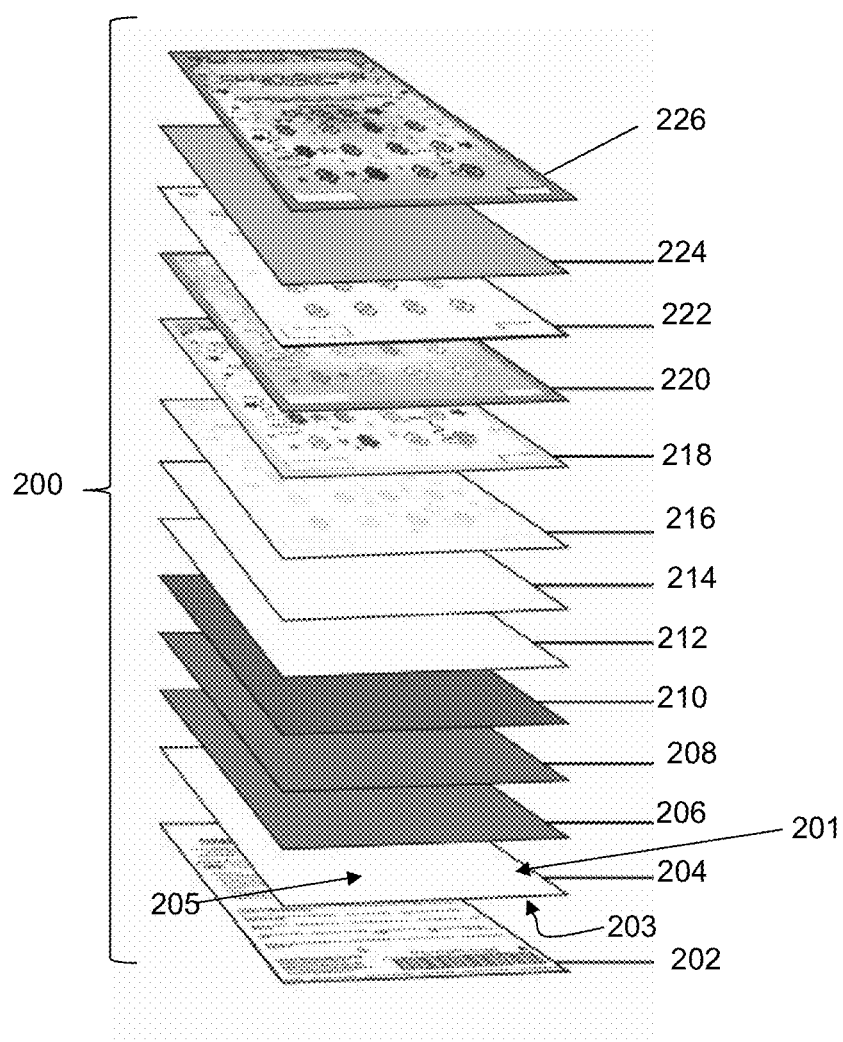
FIG. 1 is a schematic diagram of the layers of an exemplary ticket according to embodiments of the present invention.

As shown in FIGS. 1 through 11, the present invention provides a ticket vending device 15 and a system 10 for electronic distributed ticket production. Among other things, the distributed printing system 10 according to aspects of the present invention allows incomplete and/or un-activated instant lottery tickets to be activated locally and on-demand at a lottery retailer, as opposed to the traditional method where instant lottery tickets are fully printed by a printer, and then distributed to lottery retailers. It will be appreciated that ticket "activation" according to the present disclosure involves processing a ticket and imaging all of the necessary data onto it.

In accordance with embodiments of the present invention, tickets are first generated by a pre-activation process, and then packaged and delivered to retail establishments where each ticket can be activated by individual vending devices 15 upon purchase. Appropriate ticket characteristics, construction and processing facilitate objectives of the various embodiments of the present invention.

According to various embodiments of the present invention, the pre-activation printing of the ticket media, layers and graphics that define various ticket games occurs on a production flexographic printing press. In various embodiments, an in-line flexographic printing press, usually referred to as a Flexo press, is employed for the initial printing or pre-activation printing. Nevertheless, it will be appreciated that other types of printing equipment can be employed in the pre-activation printing process, including offset printing technology, digital printing technology and silkscreen printing technology, for example. It will further be appreciated that the term "printing" herein can include processes such as applying various coatings or elements to a ticket substrate, regardless of any other more limiting definition of what "printing" may encompass. As opposed to the process for printing traditional instant tickets, different ticket substrates, inks and coatings can be used. There is also a difference in how the ticket product is converted and packaged. Activation printing via the vending devices 15 at retail establishments includes thermal printing of game data and machine-readable codes at least partially under a security coating such as a scratch-off coating (SOC) area, as well as anything that may be printed in blank thermal areas on the face of the ticket. No inks or chemicals are used in the activation printing process via the vending devices 15. It will be appreciated that "applying" and "printing" may be used interchangeably herein to reflect the application by the pre-activation printer of various coatings to the ticket substrate, as well as to reflect the application by the thermal printer of elements such as game data and codes to an un-activated ticket.

With regard to ticket media characteristics, in various embodiments, a ten point (i.e., one hundredth of an inch thick) board base stock ticket substrate with thermal coating, one or more clear seal coating layers, one or more security layers and four-color ink layers can be used. It will be appreciated that these layers are specifically designed to withstand the harsh ovens on the pre-activation printing press that dry the inks and coatings but still react to the heat generated by the thermal head in the activator printer 17 of the device 15, as described hereinafter. The combination of layers on the ticket can be referred to as the active coatings. In various embodiments, the ticket substrate also requires a heavy clear coating on the back side of the substrate to counter the internal stresses created during printing that can cause the printed sheet to curl. This allows the sheet to stay relatively flat after printing, which is required in order to appropriately feed the ticket into a vending device slot, and is also preferred to give the ticket a traditional ticket feel.

FIG. 1 illustrates the different layers 200 or construction of the instant on demand ticket in accordance with various embodiments of the present invention, prior to activation by the activator printer. The thermal substrate 204 can include a number of layers or coatings, as shown. In various embodiments, the thermal layer 201 is a thermally sensitive layer applied via printing to the top face 205 of the substrate, followed by a number of other layers. These layers are designed specifically for application for use in a high speed, high temperature flexo-printing environment as described elsewhere herein. A heavy, anti-curl clear coating can be applied to the back face 203 of the substrate, and this coating can be water-based, for example. The security coatings are applied and include layers 210, 212 and 214, and the four-color process layers are applied, including black 222, cyan 220, magenta 218, and yellow 216. The security coatings can be scratch-off coatings, peel-off coatings, foil coatings and/or Mylar™-type coatings, in various embodiments of the present invention. The adhesion enhancement coating 206, release agent layer 208 and OPV 224 are specifically designed to work with the thermal chemistry of the substrate.

In various embodiments, the adhesion enhancement coating 206 is a multi-purpose coating. It provides durability and protection to the game play area. This layer prevents damage to the play symbols when the scratch off material of layers 210, 212 and 214 is being removed. A tint provided to the adhesion enhancement coating also provides a security feature to deter nefarious attempts at fraud, such as color copier reproduction or cut and paste techniques, for example.

The release agent layer 208 functions as the release layer for the scratch off system. It works in conjunction with the adhesion enhancement coating 206 to protect the play symbols. The removable security layers 210, 212, 214 provide opacity to the tickets, which prevents an individual from seeing what the play symbols are until the security layers 210, 212 and 214 are removed, and further provides an easily removable layer, which is a key component of a scratch-off or peel-off type of instant ticket. In various embodiments, layer 210 is charcoal in shading.

The removable security layers 212 and 214 provide an easily removable surface that is a key component of a scratch-off instant ticket. These layers also function to brighten the scratch surface and hide the darker layer 210, which creates a more appealing graphic print quality. Four-color process layers 222, 220, 218, 216 can be traditional black, cyan, magenta and yellow stations, respectively, that are used to create the graphics on each ticket. Additional stations can be employed in various embodiments, depending on the demands of the art work for a given ticket or game. The overprint varnish (OPV) layer 224 is a multi-functional coating designed specifically to work with the thermal characteristics of the ticket. It provides an overall gloss to the ticket that enhances the graphics. It also helps to prevent scratches when the ticket is processed through the thermal activator printer of the vending device. Further, it provides an environmental barrier to the thermal properties under the graphics. In various embodiments the OPV layer 224 can be provided with a printed interference pattern to scramble any embossing that might occur when the ticket is printed by the thermal activator printer 17 of the device 15. Embossing of the upper layers of the ticket can result in a person seeing the game indicia without having to scratch the security layer(s) off the ticket, which can lead to fraud.

During pre-activation printing, the coating deposit and the dryer temperatures are controlled. For example, the drying varies between infrared drying, hot air drying and radiation. The temperature ranges are between 100-175° F., and the ticket thickness ranges between 3-25 bcm. In various embodiments, the ticket is dried after each coating or layer is applied, and the coatings/layers are applied using flexographic printing processes. The printing speed of the pre-activation printing press can be approximately 1,000 feet per minute, for example.

In accordance with embodiments of the present invention, no security code(s) and no actual game indicia affecting the outcome of the ticket game are printed on the ticket stock during the pre-activation printing. It will be appreciated that the security construction of lottery tickets, which prevents anyone from determining if the ticket is a winner or not without scratching, is very critical to lottery printing. There are generally three to four security layers laid down prior to the game information on a traditional scratch ticket that are not needed on tickets printed according to the present invention. Since un-activation tickets according to aspects of the present invention do not have any game information on them until purchased and activated, the printing security requirements for un-activation tickets are thereby reduced or diminished. Clear release coats 204, 206 are applied to the ticket substrates over the thermal active layer and prior to the scratch off coatings. They serve to prevent the permanent adherence of the scratch coatings to the ticket or to make the ticket scratchable. They also protect the game information from being damaged while the ticket is scratched and ensure one can still read the game symbols.

In various embodiments, the security coatings 210, 212 and 214 and graphic inks 216, 218, 220 and 222 are adapted for flexographic printing and are not necessarily completely compatible with the heat required in thermal printing such as performed by activator printer 17. The tickets can thus be modified for abrasion resistance, ghosting and the buildup of ink on the thermal print head. The OPV is applied last on the flexographic press and covers all of the other inks and coatings. This prevents the ticket from getting scratched while it goes through the thermal printer, a ghost image is not created and ink build up on the thermal print head is avoided. The OPV can be a UV-based coating or can be a water-based solution that will achieve the same results, in different embodiments of the present invention.

In various embodiments, each ticket can be, for example, approximately four inches wide and can vary in length from approximately four inches to approximately eight inches. A thermal coating can be applied onto the entire area, wherein areas to be thermally printed are both under security coating(s) and in clear areas, such as for messaging, for example.

Areas for printing can vary by game. A margin of 0.125" unprintable on all sides can be provided for, but this can vary. Further, the ticket can be provided with potential hanging slots/holes for merchandising, one or more machine-readable codes representing a unique ticket and/or game identifier, for example, on the front or back of the media, lottery specific printed information, such as disclaimers and game rules, for example, and registration marks on the front or back of the media for alignment during printing.

Game tickets according to the present invention can be sold as individual tickets, not packs. With traditional tickets, post-printing processing typically involves converting the instant tickets to being ready for use and play. However, not all such steps happen immediately after the pre-activation printing in accordance with the present invention. In various embodiments, the printed, un-activated ticket substrate is taken up on a roll at the end of the flexographic printing process. The rolls are then moved to a sheeter where the rolls of printed material can be converted into sheets. The sheets are collected and eventually cut down into individual tickets, packed and shipped. Equipment for perforation and fan folding can be connected to the end of the printing press and forms a continuous process. Tickets are then manually separated into books, such as a continuous string of tickets usually from 50-300 tickets depending on customer requirements, and then packed in cartons. The cartons are then delivered to retail establishments containing devices 15 capable of conducting the activation printing via an activator printer 17.

It will thus be appreciated that the pre-activation process involves a first printer (e.g., flexographic printing press) that prints a series of incomplete or, un-activated, lottery tickets having no game indicia and no security code, but including at least an adhesion enhancement coating, at least one release agent coating, at least one security coating, a plurality of color layers and an overprint varnish layer atop a top face of a ticket substrate, and an anti-curl clear coating atop a back face of the ticket substrate.

Figure 2:
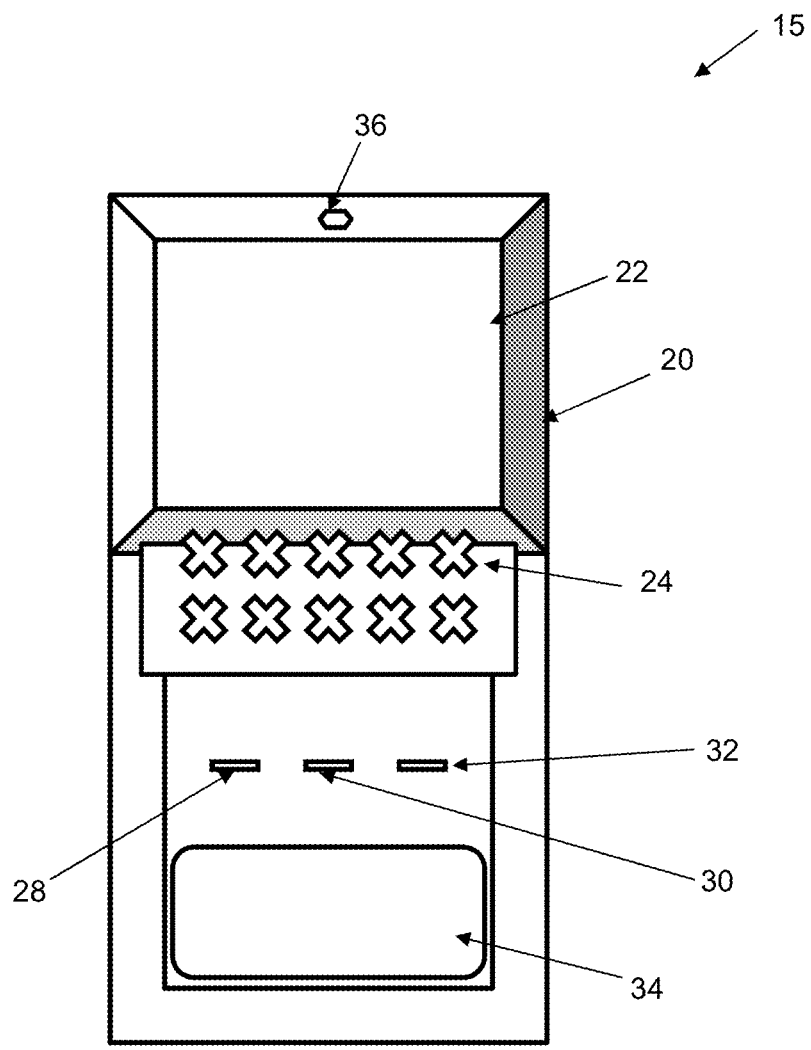
FIG. 2 is a schematic diagram of a vending device in accordance with embodiments of the present invention.
Figure 3:
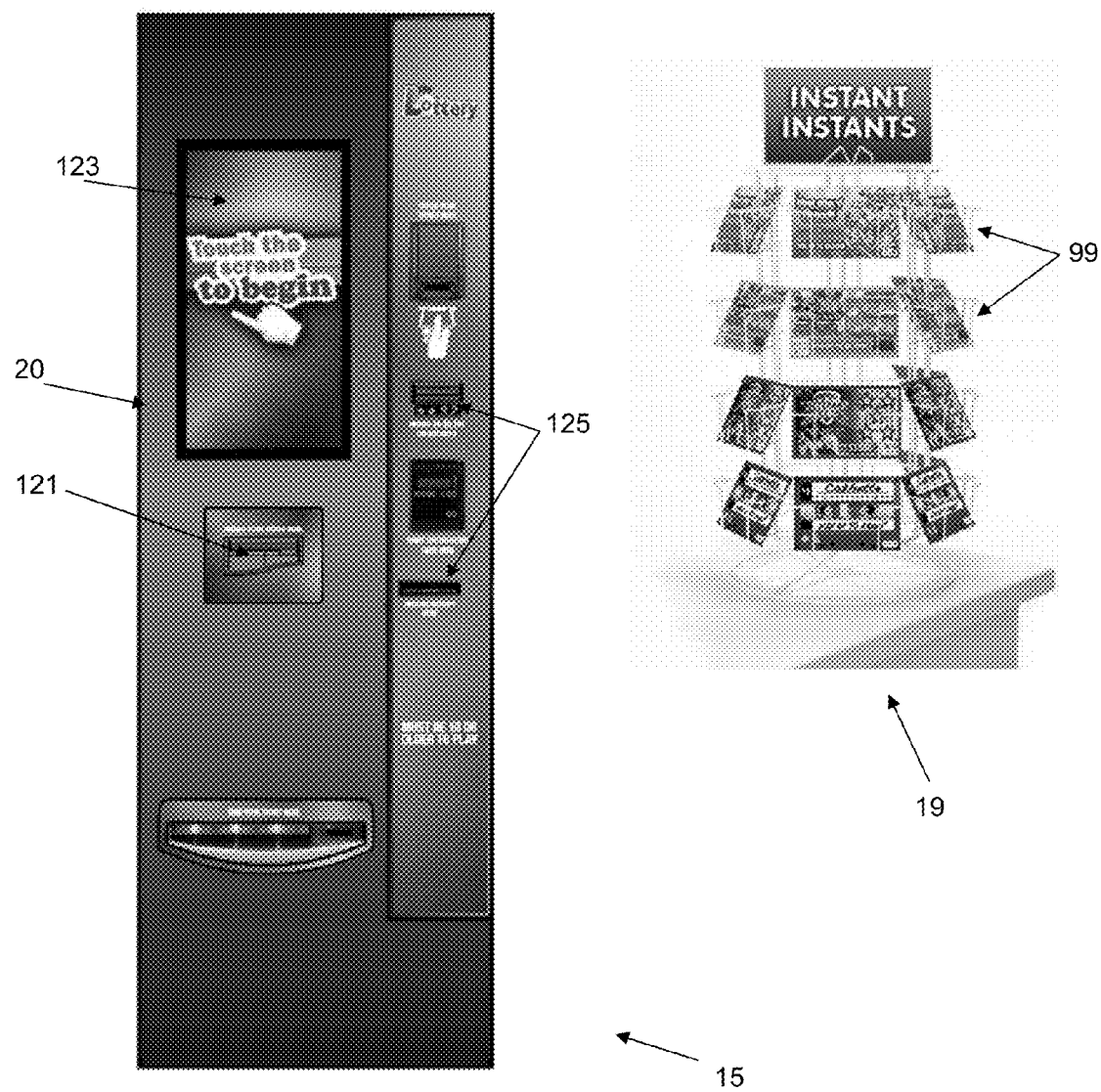
FIG. 3 is an image of a vending device alongside an image of a retail stand holding incomplete tickets in accordance with embodiments of the present invention.
Figure 4:
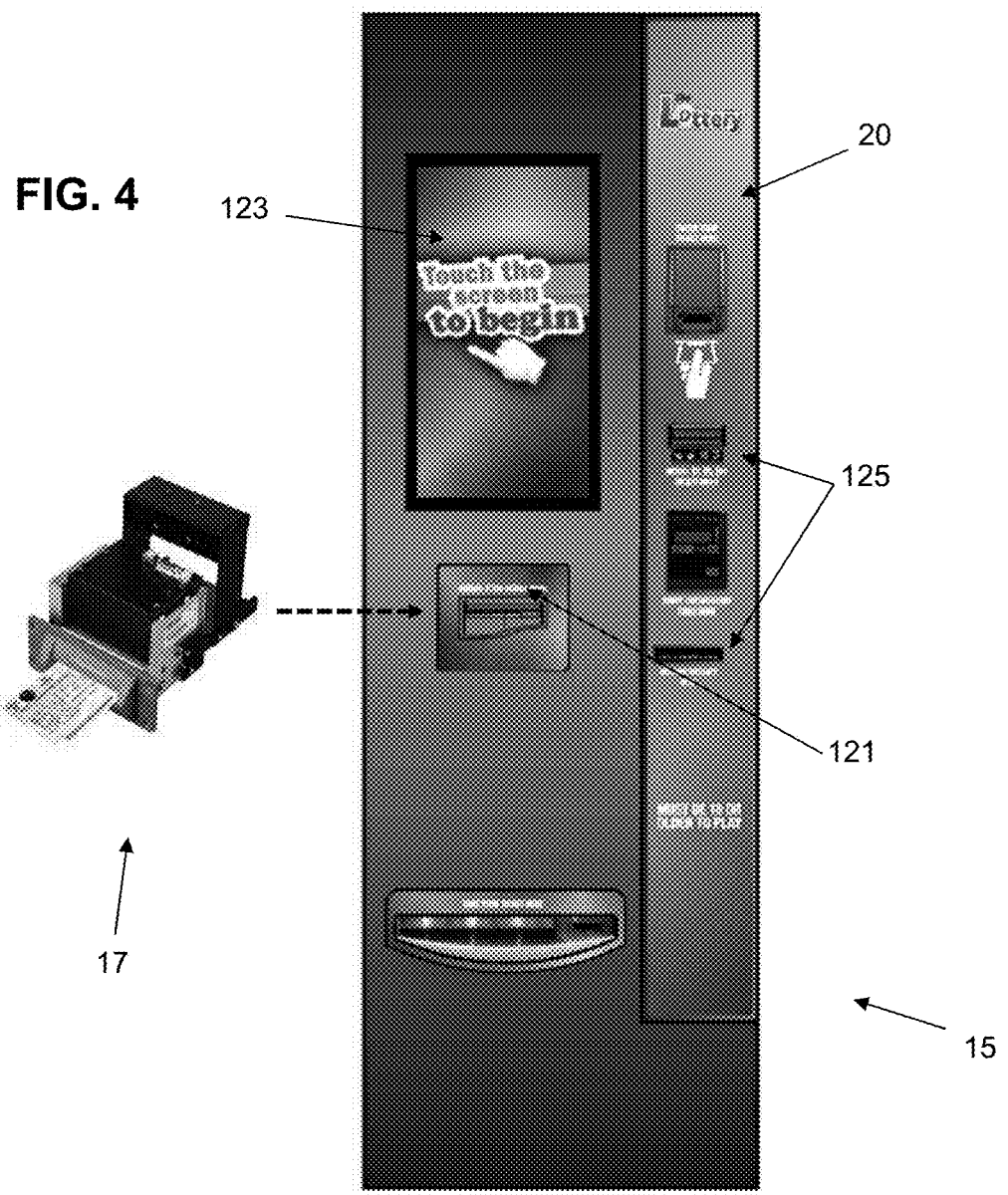
FIG. 4 is an image of a vending device alongside an image of a printing device that can be maintained within the vending device in accordance with embodiments of the present invention.

At a second location, such as a retail environment separate and apart from the pre-activation printing location, the second, or activation, printing process takes place. As illustrated in FIGS. 2 through 4, a distributed lottery ticket vending device 15 in accordance with embodiments of the present invention is provided with a cabinet 20 that stores an internal ticket printing component, also called an activator printer (shown schematically at 17 in FIG. 4). The activator printer 17 is the device that thermally prints through the security coating(s) and other coatings on the un-activated ticket (e.g., shown at 99 in FIG. 3) to activate it at the time of purchase. The activator printer (e.g., 17 in FIG. 4) can use thermal printing technology, but has a number of non-traditional features that are required to support the ticket requirements in accordance with the present invention. As described elsewhere herein, the device 15 allows the player to insert the un-activated ticket into the front of the unit, have it transported in, processed, printed and dropped into a hopper/bucket which is located on the front panel of the device 15.

It will be appreciated that the characteristics of ink and clear coatings from the pre-activation processes can have an impact on the printer head of the activator printer during operation. In various embodiments, the head energy and speed required to image the tickets using the activator printer may vary, but may be, for example, two to six inches per second. Higher print speeds may be accommodated.

A built in code reader (e.g., barcode reader) component provided as part of I/O component 33 of device 15 reads the unique machine-readable identification element on the ticket as well as the registration marks used for alignment of the images printed on the front of the ticket. With regard to media identification and registration, a CIS reader can be employed for both tasks, for example. In various embodiments, the machine-readable identification element on the front or back of the ticket uniquely identifies the specific piece of media as well as which ticket game has been selected. The registration marks assist with alignment and noting which end of the ticket has been inserted first in the device 15, for example. Further, in various embodiments, the machine readable identification element can be a code, such as a barcode, an embedded radio frequency identification (RFID) tag, or a pattern and/or design, such as game-related art printed on a face of the ticket. In addition to a code reader component, the I/O component 33 can further include and RFID reader, a scanner and/or components enabling receipt of communications by Bluetooth™ and near-field communications (NFC) technologies, for example.

The printer to kiosk interface can be, in various embodiments, a USB 2.0 or 3.0 interface. The interface is used for: retrieving information for the identification element 89 read from the un-activation ticket; specifying print areas to be printed under the security coating(s) versus clear areas, specifying print graphics to the printer; and specifying registration commands. The printer 17 and/or device 15 can also assist with avoiding media skew during operation. In various embodiments, this process is performed using sensors operable by a kiosk central processing unit, which can affect both mechanical alignment of the ticket as well as image alignment for printing. In various embodiments, the ticket can be rejected if and when an unacceptable degree of skew is determined to be present.

With regard to ticket feeding and the paper path for the printing device 17, the ticket media must be fully inside the printer until printing is complete (so that user cannot affect printing by trying to pull the media out before complete, for example). It will be appreciated that accommodations can be provided to reduce the printer depth by curved paper path or other means. Further, transport and dispensing options for ticket processing include: reciprocating with typical presenter dispensing, reciprocating with dispensing into some sort of hopper/stacker and feed-through with internal dispensing into hopper/stacker.

While device 15 is shown in stand-up configuration in FIGS. 3 and 4, it will be appreciated that a similar device can be provided for a countertop configuration with an interface to a retailer terminal for clerk-activated tickets. In such an embodiment, transport and dispensing options can include a feed-through rather than reciprocating transport. As noted above, a clerk can insert un-activated media behind the counter, and the finally printed and activated ticket is dispensed from the other end to the player.

In various embodiments, multiple perforated (but joined) tickets can be inserted into the device, and then separated by the device or by the player after activation. Additionally, the tickets can be manufactured so as to at least partially clean the printer head and/or rollers while being processed through the printer, as these items can have a security coating build up over time that hinders desired performance. In various embodiments, a separate cleaning ticket, not to be used as part of any game, can be employed for this purpose.

In various embodiments of the present invention, as shown in FIG. 3, for example, un-activated printed tickets can be made available to players for selection externally to the vending device 15, such as on a rack 19 as pre-paid gift cards are commonly found, for example. The ticket substrate can be cardboard, paper, foil, coated board or other material. In various embodiments, the ticket substrate is coated thermo-sensitive paper as described above, capable of use with thermal printers, as described elsewhere herein.

In various embodiments, the un-activated ticket can have a scratch-off area, but no actual game indicia or "game data" under the scratch-off area and no security codes or security data anywhere on the ticket until after it is activated by the activator printer 17 within device 15. Further, in various embodiments, the kiosk or device 15 is provided with a slot such as shown at 121 to insert tickets for printing by the activator printer 17 in addition to a user interface 123 and payment processing mechanisms 125. In these embodiments, it will be appreciated that players can peruse all of the games and ticket designs externally to the device 15, and then pick the one they want to buy. Alternative embodiments provide for un-activated tickets without game data printed thereon to be stored in the cabinet of the device 15, whereupon such tickets are fully printed and customized based upon user input received by the vending device 15.

In various embodiments, the activator printer 17 within each vending device 15 comprises a thermal printer that requires no inks. Such printers operate by selectively heating coated thermo-sensitive paper such that the coatings turn into readable information, colors and/or designs as desired for a given game. The activator printer 17 can thus print graphics, instructions, game indicia, photographs, security codes and other material on individual tickets. Other printing technologies and printing materials can be provided in different embodiments. The vending devices 15 can also include traditional machine elements used to physically manipulate and/or advance tickets through the printer and dispense tickets from the device. The activator printer is capable of imaging the entire backside of the inserted ticket and recognizing player selected options that may be available for the game represented on the ticket. By allowing players to make selections on the backside, the present invention enables much of the functionality available on a touch screen device on a small counter top device. Customization selections, including personalization and game parameter selections, made available to players can be implemented using this technique. Alternatively, customization selections available to players can be implemented through inputs from the user to the device at the time the ticket is inserted. In various embodiments, a player's customization selection options can be communicated to the vending device via a code displayed on an object such as paper or the display of a user's personal communications device. Such a code can represent information and/or choices previously selected by a player prior to using the vending device to purchase a ticket. For example, a player may access a mobile application or a website at a separate location from the location where the vending device resides, and may indicate that the player would like to generate a code representing, for instance, the top prize that the player wishes to play for (e.g., a new vehicle, a cash prize, a vacation, etc.). The player may desire to generate a code representing a link to a social media website in order for the player to print the latest photograph or other content from a social media website on the player's ticket. The customization selection options can be voluminous, yet can be represented by a code that is read by an element of the vending device 15, such as a code reader component, in order to customize the ticket as desired by the player. In various embodiments, the code can be read via Bluetooth™, near-field communication (NFC) technology or other technologies beyond a code reader component as described.

As shown in FIG. 2, a representative vending device 15 can be provided with a user display interface 22, user input elements 24, cash payment interface 28, card interface 30, ticket or receipt dispensing slot 32 and ticket or receipt dispensing bin 34. It will be appreciated that the physical arrangement of payment input and ticket/receipt dispensers can vary according to the type of device 15 employed. For example, cash payment interface 28 can be a bill receptacle and a coin receptacle. Card interface 30 can be an interface for receiving credit cards, debit cards, player cards and other cards having machine readable indicia such as barcodes or magnetic strips, for example. Dispensing slot 32 can dispense tickets and/or receipts with perforation that can be torn by the user, and/or dispensing bin 34 can be provided as a bin where tickets/receipts are dispensed without the need for perforation to be torn, for example. Alternative vending devices 15 are shown in FIGS. 3 and 4.

User input elements 24 can be provided as physical input mechanisms, such as a keyboard, joystick, mouse, pushbutton or other non-touchscreen physical interface, or may be a touchscreen interface 22 (or 123 in FIGS. 3 and 4) presenting user options for selecting and customizing a ticket for purchase, for example. It will be appreciated that the user input elements 24 can be a combination of physical non-touchscreen elements as well as touchscreen input elements, in various embodiments of the present invention. In various embodiments, the device 15 can also be provided with a camera component 36 for recording still images and video pursuant to player requests, or pursuant to security and surveillance requirements, as appropriate.

Figure 7:
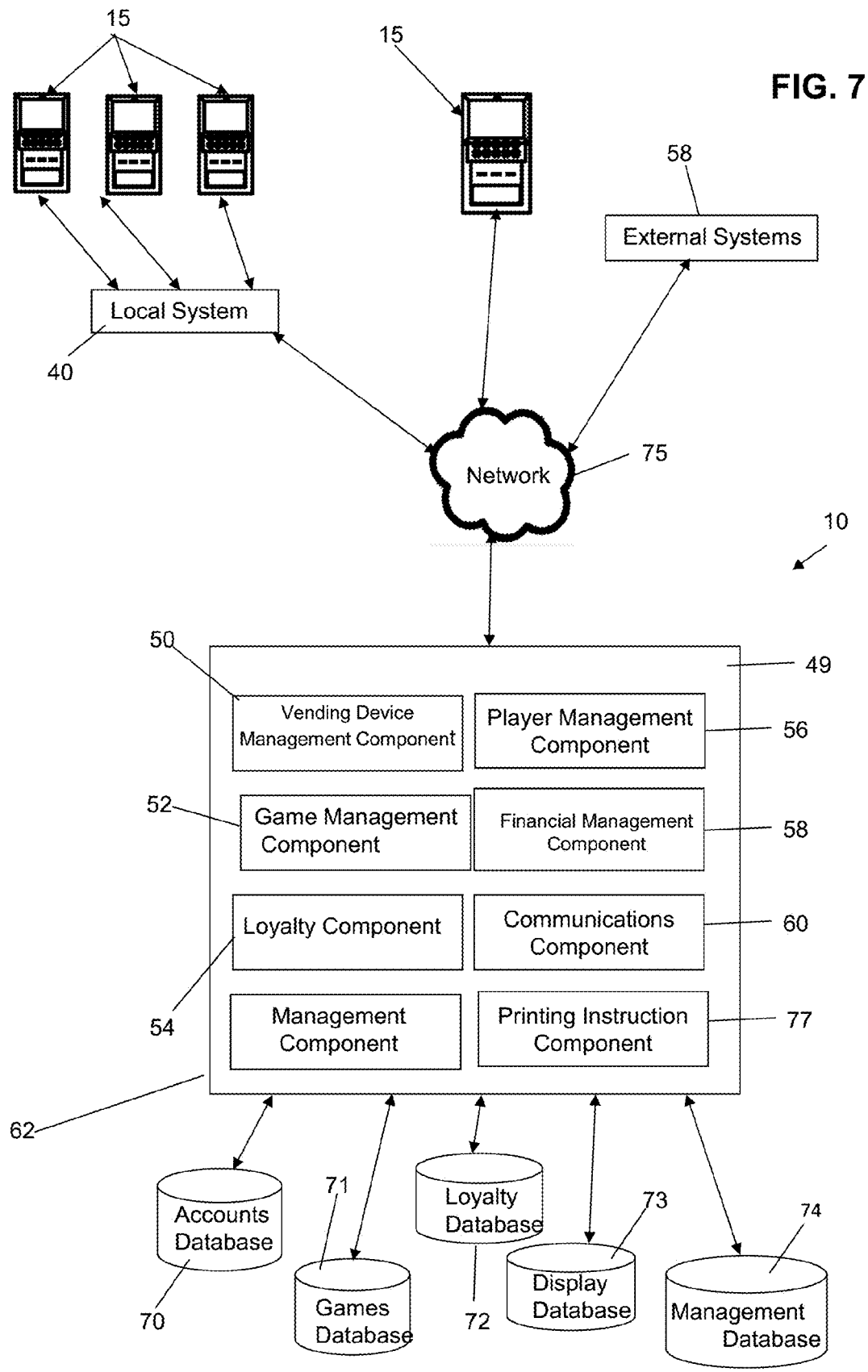
FIG. 7 is a schematic diagram of a system interacting with vending devices in accordance with embodiments of the present invention.

In addition to the above, the vending devices 15 further have necessary hardware and software for performing device functions and communicating with other devices, such as other printers, a local area network, and a central lottery ticket server/production management component ("central host") 49, as shown in FIG. 7. With a central host-based architecture, the remote central host (for example, a lottery system host) 49 can securely communicate ticket details, such as game indicia, bar codes, security codes, etc., to the vending device 15 for printing on a ticket in response to a given wager request.

Figure 5:
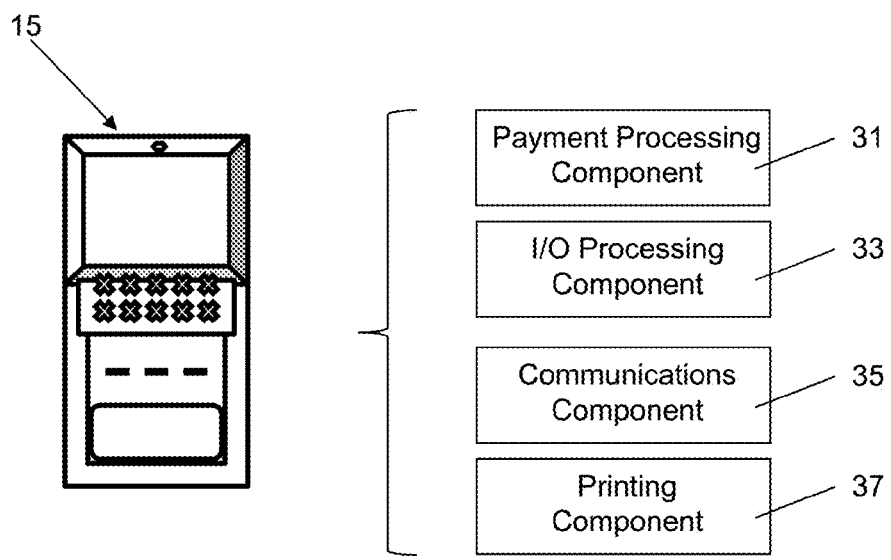
FIG. 5 is a schematic diagram of elements of a vending device in accordance with embodiments of the present invention.
Figure 6:
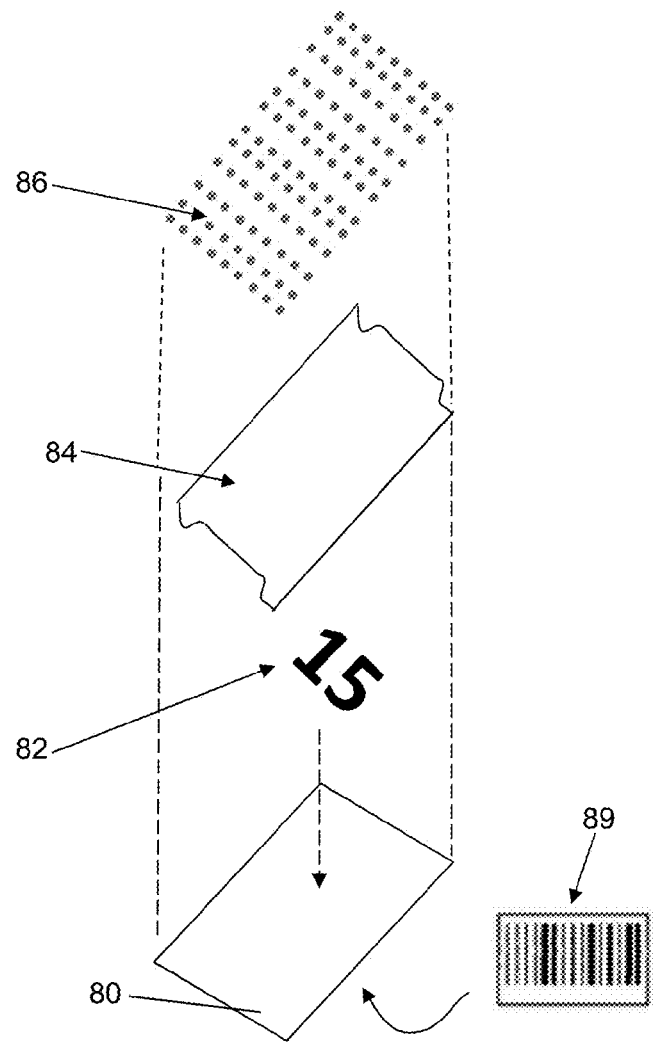
FIG. 6 is a schematic showing exemplary printed and/or activated layers for an exemplary ticket.

As shown in FIG. 5, the vending device 15 can include various hardware and/or software components, such as payment processing component 31, input/output processing component ("I/O component") 33, communications component 35 and printing component 37. These components can comprise, for example, software programming in the form of stored instructions that are stored in a memory within the device 15, wherein the stored instructions are executed by a processor provided as part of the device 15 as necessary to conduct the operations and perform the functions of the device as described herein, for example.

The payment processing component 31 processes payments made via the device 15, whether such payments involve cash, debit/credit card, player card, cashless technology, loyalty redemptions or other payment forms. In various embodiments, players are provided with game credits on the device 15 based upon valid payment being recognized by the payment processing component 31 of device 15. The I/O component 33 can receive inputs from a user, such as a ticket request, a payment selection, player identification information, a customization request, a communication request and other input, and processes the input to achieve the desired result. The I/O component 33 can further receive or read inputs from an inserted ticket, such as an identification element 89 on the ticket or physical selections made on the ticket by the user. The communications component 35 communicates with elements of the device 15, the central host 49 and external systems 58 depending upon the instruction involved. For example, a user request to take a photograph of the user can be received by the I/O component 33, and communicated via communications component 35 to the camera component 36 for performing the desired function. The printing component 37 comprises activator printer 17 as described elsewhere herein, and executes the required printing instructions based upon information received by I/O component 33 and central host 49. For example, and with reference to FIGS. 5-6, the printing component 37 can operate to print indicia 82 on a ticket substrate 80 stored in the device cabinet 20 or input into the device 15.

While the printing component 37 can also operate to print a graphic design layer 86 or machine-readable code 89 onto the substrate 80, such printing tasks can also occur prior to delivery of tickets to the retailer through the use of a separate ticket manufacturer. In various embodiments, a printing instruction component 77 operated via central host 49 in FIG. 7 informs a ticket manufacturer system (such as an external system 58) as to what un-activated tickets are to be printed, including what ticket games and what game or ticket identification elements (e.g., code 89 of FIG. 6) are to be printed in the pre-activation stage. Other elements can be printed depending upon the player's request, the game and the printing technology employed, for example, either locally at the device 15 by activator printer 17, or prior to activation printing. Each of the components 31, 33, 35 and 37 is in communication with central host 49 via a form of network connection 75, as illustrated in FIG. 7.

With reference to FIG. 7, and depending upon the implementation, a wager request may be received at a device 15 and then transferred to the central host 49. Payment can be handled at the device through elements 28 or 30 as described above, or may be handled through interface elements 22 or 24. For example, a user may employ a touchscreen interface 22 to enter player card, debit card or credit card details for processing a financial transaction. In various embodiments, a user can provide payment for credits, wherein the credits can be used to purchase tickets as described herein. The wager request can further include the selection of a desired game, ticket design, wager level, prize structure or other selection made through various user inputs. As noted above, the ticket can also be selected externally from a kiosk or device 15, and then fed into a suitable slot on the device 15 for printing. In any event, once the payment and ticket/ticket selection have been received by the device 15, and once the user has selected any custom options, the device 15 can read a pre-printed machine-readable identification element (e.g., 89 in FIG. 6) on the front or back of the inserted ticket, such as by using a code reader component included in the vending device 15. The identification element 89 can identify the specific game associated with the ticket, and/or the specific ticket itself. Next, the communications component 35 transfers the specific player inputs and information associated with the identification element 89, to the central host 49. It will be appreciated that information associated with the identification element that is sent by the device 15 to the host 49 can be the identification element itself, or can be translated information represented by the identification element, or can be both the identification element itself along with translated information represented by the identification element, according to various embodiments of the present invention.

It will be appreciated that embodiments of the present invention can operate such that all player inputs are transmitted to the central host 49 for processing and storing, or a subset of player inputs are transmitted. For example, the player's game request and the ticket's code information can be sent to the central server 49 for processing, while the player's request for a photograph to be taken by camera 36 need not be transmitted to the central host 49, but can rather be communicated within the device 15 and the function of taking the photograph and printing it on the ticket can be managed entirely at the device 15. In various embodiments, data is sent to the central host 49 for storage in connection with the player regardless of whether all player inputs are initially sent to the central host 49 for processing. Thus, even if the photograph of the player is managed entirely by the device 15, the image file comprising the photograph can later be sent to the central host 49 for storage, such as in player account database 71 described hereafter. In this way, the system 10 can offer the player the opportunity to reproduce the photograph on a later ticket, or to publish to photograph using social media, for example. With respect to publishing of content, the player can initiate such action at the vending device 15, which can employ communications components 35, 60 to communicate with external systems 58, such as social media websites, for example.

Once the instructions and input are received, the central host 49 processes the transaction request, including any loyalty and related player account details, issues information to be printed on the ticket (such as game graphics, instructions, game indicia and security code(s), for example) to the device 15, and the activator printer 17 then prints the requested ticket at the device location. Optionally, receipts, player loyalty account information and other information can be printed as well by the device 15. The printer can transmit transaction related information, as well as non-transaction related information (for example, out of paper, printer malfunction) over the data network 75. The activator printer 17 can print game data received from the central host 49 thermally through and/or under any security coating(s) on the ticket. The printer 17 can further print the player's personalization options on the ticket. The printer can also embed appropriate security codes received from the central host 49 on the ticket, after which the device 15 ejects the fully printed and optionally customized ticket for the player to play. It will be appreciated that different areas on the surface of the ticket will correspond to different features depending upon the ticket inserted into the device 15. For instance, a first ticket may have game indicia printed at the bottom while a second ticket may have game indicia printed on the left or right side of the ticket surface. Among other things, the identification element 89 on the ticket informs the central host 49 as to the layout of the ticket so that instructions received from the central host 49 by the device 15 inform where on the surface of the ticket the various game data and any personalization or other items to be printed should occur.

As shown in FIG. 7, the central host 49 can be provided with various software components such as, for example, vending device management component 50, game management component 52, loyalty component 54, player management component 56, financial management component 58, communications component 60, administrative component 62 and pre-activation printing instruction component 77. These components can access and employ various databases for storing and retrieving data in accordance with the desired functions of the present invention. Databases can include, for example, an accounts database 70, a game database 71, a loyalty database 72, a display database 73 and an administrative database 74. The accounts database 70 can store information related to player accounts, including player identification details, player usage and transaction history, player preferences, player financial information and account details and other information. The game database 71 can store information pertaining to available games for selection, including graphic designs, indicia, scratch-off locations, available wager amounts, odds and other game-related elements. Loyalty database 72 can store various loyalty-related data, including redemption prizes, qualifying levels and other loyalty items. The display database 73 can store a library of displays to be presented on the vending device interfaces 22, including player selection options (for touch-screen selection) as well as visual outcome displays or animations employed during inactive periods or for entertainment during player use. Administrative database 74 can store information such as device-specific statistics to permit LSPs and retailers to better understand device usage, including game-related statistics, ticket volumes, retailer statistics and other information that can assist in better servicing players, increasing revenue and overall management of devices.

The specific software components can comprise computer-readable instructions stored in suitable memory and operable by one or more processors to perform the functions necessary for operation of the embodiments of the present invention. For instance, the vending device management component 50 operates to receive instructions from the vending devices 15, process the desired transactions and requests, and deliver instructions to the vending devices 15 for printing and otherwise executing the desired vending device functions. The game management component 52 operates to process specific game-related instructions such as, for example, selecting desired game details from the game database 71, configuring the details according to player requests and game rules, and delivering the details to the vending device 15 for printing, display and other operations. The loyalty component 54 operates to process loyalty-related transactions as appropriate based on player interaction, including adding to or subtracting from a loyalty points total, redeeming loyalty points and issuing prizes as appropriate. The player management component 56 processes player-related details, including player transaction requests and updates the accounts database 70 accordingly. The financial management component 58 operates to process financial transactions initiated at the vending devices, including communicating with accounts database 70 and any external providers 58, such as financial institutions, for example. The communications component 60 operates to communicate with the vending devices 15 and external providers 58 over data network 75 to perform functions in accordance with the embodiments of the present invention. For example, if a user desires to publish information associated with the operation of the present invention to a social media website, the communications component 60 (or alternatively, the communications component 35 of the device 15) can operate to send the information to a suitable external system 58 for appropriate action. The administrative component 62 process administrative related information, such as statistics and administrative control information, to and from administrative database 74. Such information can be employed by external systems 58 such as an external administrative operator, or by local systems, such as system 40, which can be a retailer operation controlling multiple devices 15 as shown in FIG. 3, for example. As further shown in FIG. 7, it will be appreciated that system 10 can be deployed with direct connections from central host 49 to a device 15 via network 75, or indirect connection through a local computing system 40. Data network 75 can comprise a publicly accessible network such as the Internet, a private network, a wireless network, a local or wide-area network or other understood form of network.

The pre-activation printing component 77 processes instructions for printing incomplete and/or un-activated tickets without specific game data or security data, but with other elements such as game background art, a ticket or game identification element (e.g., 89 in FIG. 6) and other elements printed onto a ticket for delivery to retail establishments for later processing into complete tickets by local device 15. The game identification element can be a code, such as a barcode, for example, and can also be the graphical layout of ticket art elements, for example. For example, such elements can be communicated from component 77 to an external lottery ticket manufacturer (e.g., 58) for printing according to the pre-activation printing processes identified elsewhere herein. Whether such initial printing is performed as instructed by pre-activation printing component 77 associated with central host or through separately provided instructions, appropriate printing instructions can be provided electronically to inform what is printed on the incomplete and/or un-activated tickets prior to delivery to the establishment where local device(s) 15 resides.

Figure 8:
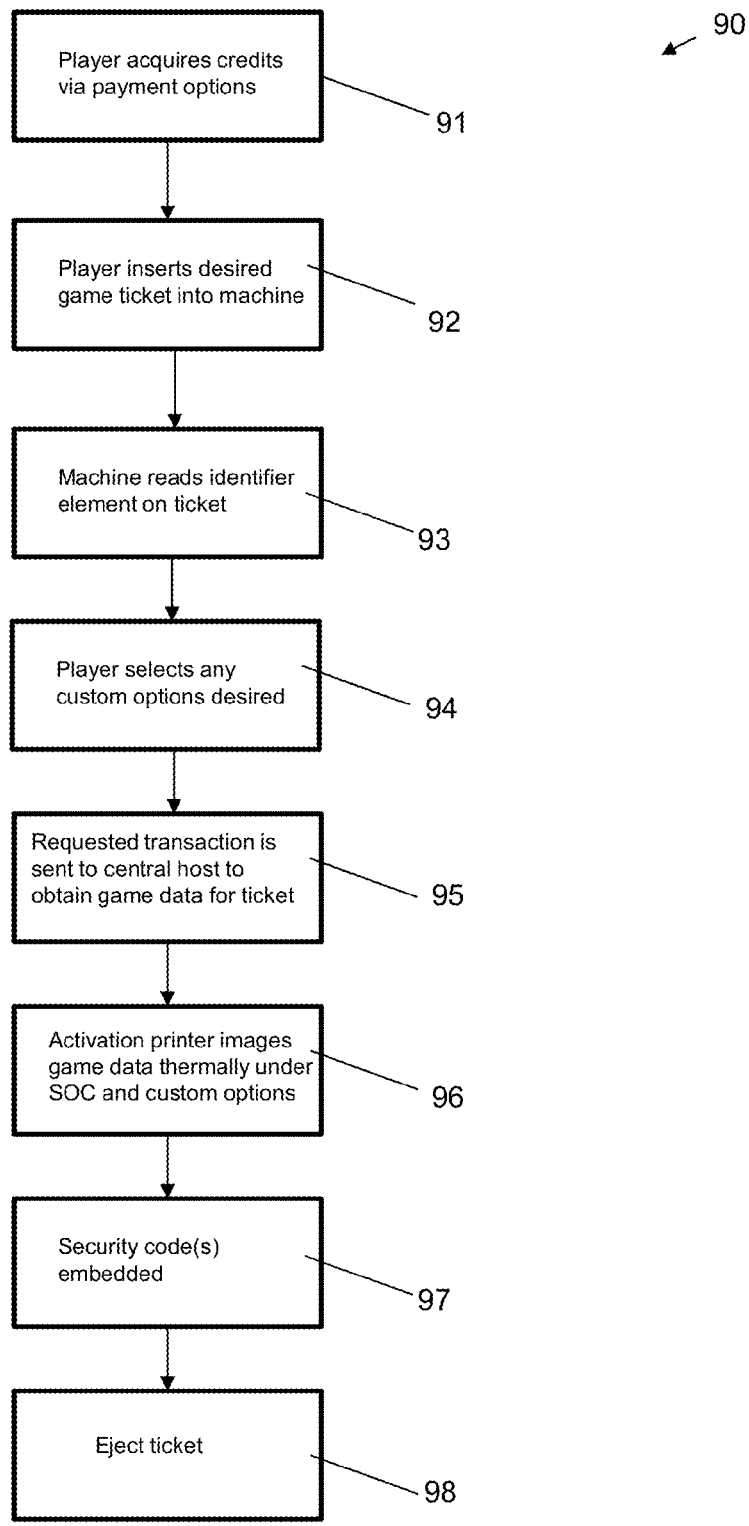
FIG. 8 is a sample flow diagram illustrating process steps in a self-service transaction in accordance with embodiments of the present invention.

FIG. 8 is a sample flow diagram 90 illustrating process steps in accordance with embodiments of the present invention. As shown at 91 therein, the player first acquires credits by one or more payment options as described elsewhere herein. Next, as at 92, the player inserts the desired un-activated game ticket into the device 15. At step 93, the appropriate reading device within the vending device reads the identification element on the the ticket, which allows the system to present various customization options associated with the identified game to the player. At step 94, the player selects and/or communicates any custom options desired, and at step 95, the details of the requested transaction as understood from the code and any custom options selected by the player are sent to the central host. The central host then obtains game data for the ticket and sends it to the device. At step 96, the activator printer 17 in the device 15 images the game data and any custom options on the ticket, wherein the game data is imaged thermally under the security layer(s). At step 97, one or more security codes are embedded by the activator printer 17 on the ticket. At step 98, the device 15 ejects the ticket.

In various embodiments, the printing by the activator printer 17 can take multiple passes in order to fully print the desired game ticket, including the game information. It will be appreciated that each ticket will have no value until it is printed by the devices 15 using information received from the central host 49.

Figure 9:
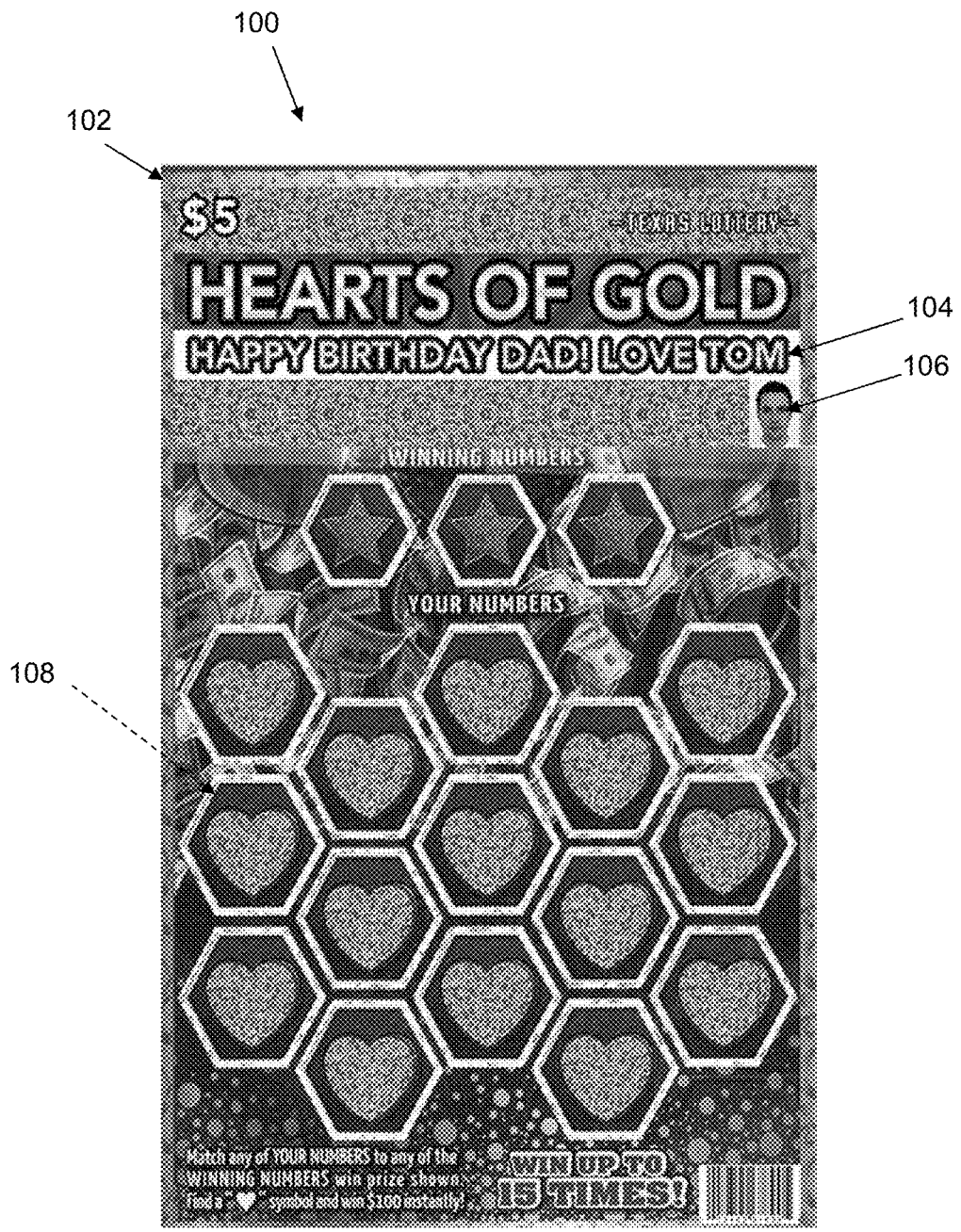
FIG. 9 is a sample ticket as printed in accordance with embodiments of the present invention.
Figure 10:
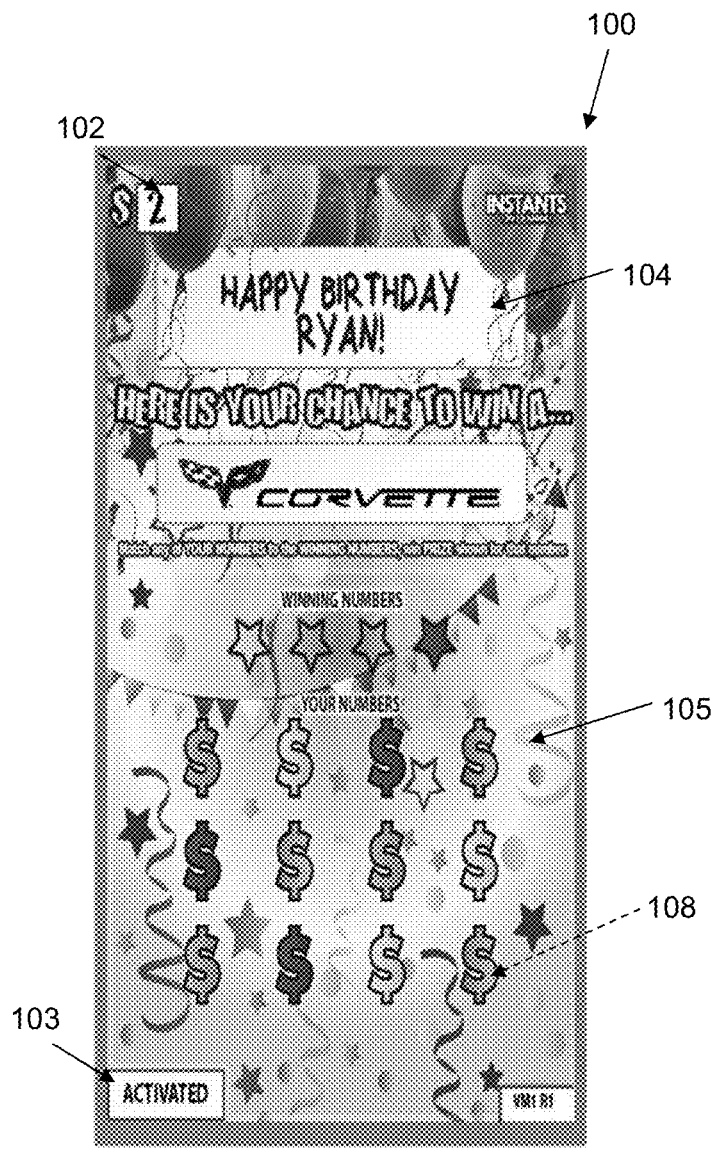
FIG. 10 is a sample ticket as printed in accordance with embodiments of the present invention.

FIGS. 9 and 10 show sample tickets 100 as printed in accordance with embodiments of the present invention. As shown in FIG. 9, the ticket can include a player-selected price 102, personalized wording 104, personalized image 106, data 108 printed thermally under security coating material on the ticket, graphic images 105 that may be pre-printed during the pre-activation process, and a security code (not shown). FIG. 10 also shows that the ticket can include an activation indication 103 showing whether or not the ticket has already been activated.

Figure 11:
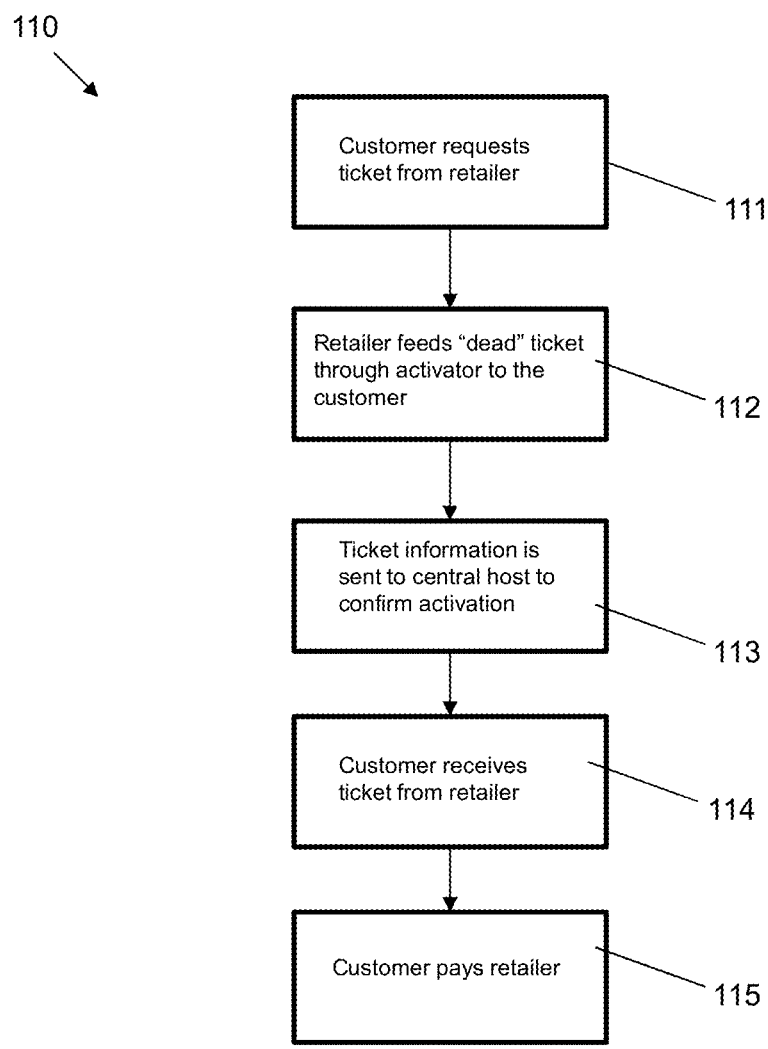
FIG. 11 is a sample flow diagram illustrating process steps involved in activating a ticket in accordance with embodiments of the present invention.

FIG. 11 is a sample flow diagram 110 illustrating process steps in accordance with other embodiments of the present invention as alternatives to the pre-printed ticket selection example described above. As at step 111, a customer can request tickets from a retailer that are located behind a counter. As at step 112, a retail clerk can then feed the "dead" or un-activated ticket into an activator printer 17 in a retailer device 15, after which data and ticket information (e.g., as read from the ticket) are sent to the central host 49, as at step 113. The host 49 reads the information, and generates and sends appropriate game data and security code(s) back to the device 15. The device prints the received information on the ticket ejects the completed ticket. In various embodiments, the ticket can be ejected towards the customer, while in various other embodiments, the ticket can be ejected toward the retail clerk, who then gives the ticket to the customer as at step 114 and receives payment as at step 115. In the former embodiments, the ticket is fed by a first user (e.g., the retail clerk) in one side of the device 15, and the ticket is ejected out of another side of the device (e.g., to the user/customer/player). In various embodiments of the present invention, the "dead" ticket is fed into a retail clerk-side slot on a point-of-sale terminal, and the completed/activated ticket is printed from a separate printing device in communication with but separate from the point-of-sale terminal. Communication between the point-of-sale terminal and the separate printing device can be through Bluetooth or other short distance communications protocol.

It will be appreciated that the various embodiments of the present invention as described herein assist in many ways, including for example: eliminating the cost of secure printing, packaging, shipping and warehousing; restricting security to anti-counterfeiting codes printed upon activation; eliminating inventory loss at retailer; performing activation and immediately delivering ticket to consumer; simplifying retailer accounting; permitting players to always get to play the game they want, without running out of tickets; central control of game payout percentages, winning ticket distribution and promotions; extending popular games indefinitely with no break in delivery; and cross marketing scratch games with draw-based games dynamically.

It will further be appreciated that the various embodiments of the present invention as described herein assist in providing a new way of creating instant scratch tickets. Rather than producing the complete ticket with game data and prizes at the time of printing by the instant ticket vendor, the actual game determination data or indicia is printed through the security coating at the time of purchase and on demand. In addition to the above benefits, this helps reduce the traditionally high cost of traditional self-service vending solutions, provides a desirable small footprint solution, provides more features for consumers/players and creates new opportunities for games that can't be done with traditional instant tickets. Further, new types of instant games are possible based on the outcome determination and printing at time of sale. Games such as probability games may even be provided. Additionally, the present invention can provide for player selection of game options like price point, prize payout levels, etc., and provide a player with the option to personalize tickets with messages for gift giving, for example.

In various embodiments, a self-service kiosk version of the device 15 functions both as a sales device for instant tickets as described herein, as well as a self-service terminal for online games and/or e-instant tickets, including online or electronic tickets that are not printed onto physical tickets. In specific embodiments, and as referenced above, device 15 houses a touchscreen display, an activator printer 17, a code reader (e.g., as part of I/O component 33), such as a two-dimensional barcode reader, a bill acceptor, a cashless payment module and a receipt printer (for online game receipts and/or cashless payment receipts).

Players are able to browse the games available for sale on the merchandising display (e.g., display 19 in FIG. 3) and then activate their ticket at the kiosk 15. As noted above, the cards or tickets 99 on the display 19 have been through the pre-activation printing process and appear to be just like any other instant ticket. However, they have no game indicia or game determination data printed under the scratch off area and no printed security codes. A machine-readable code (e.g., 89) on the ticket can indicate, among other things, what the game identification is for that particular ticket. Players can peruse all of the games displayed on the rack and pick the one they want to buy.

Unless otherwise stated, devices or components of the present invention that are in communication with each other do not need to be in continuous communication with each other. Further, devices or components in communication with other devices or components can communicate directly or indirectly through one or more intermediate devices, components or other intermediaries. Further, descriptions of embodiments of the present invention herein wherein several devices and/or components are described as being in communication with one another do not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, a processor (e.g., a microprocessor or controller device) receives instructions from a memory or like storage device that contains and/or stores the instructions, and the processor executes those instructions, thereby performing a process defined by those instructions. Further, programs that implement such methods and algorithms can be stored and transmitted using a variety of known media.

Common forms of computer-readable media that may be used in the performance of the present invention include, but are not limited to, floppy disks, flexible disks, hard disks, magnetic tape, any other magnetic medium, CD-ROMs, DVDs, any other optical medium, punch cards, paper tape, any other physical medium with patterns of holes, RAM, PROM, EPROM, FLASH-EEPROM, any other memory chip or cartridge, or any other medium from which a computer can read. The term "computer-readable medium" when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, optical or magnetic disks and other persistent memory. Volatile media can include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP), Wi-Fi, Bluetooth, GSM, CDMA, EDGE and EVDO.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, with programmed steps of the method of the invention for execution by a processing unit. Aspects of the present invention may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example. Appropriate hardware, software and programming for carrying out computer instructions between the different elements and components of the present invention are provided.

The present disclosure describes numerous embodiments of the present invention, and these embodiments are presented for illustrative purposes only. These embodiments are described in sufficient detail to enable those skilled in the art to practice the invention, and it will be appreciated that other embodiments may be employed and that structural, logical, software, electrical and other changes may be made without departing from the scope or spirit of the present invention. Accordingly, those skilled in the art will recognize that the present invention may be practiced with various modifications and alterations. Although particular features of the present invention can be described with reference to one or more particular embodiments or figures that form a part of the present disclosure, and in which are shown, by way of illustration, specific embodiments of the invention, it will be appreciated that such features are not limited to usage in the one or more particular embodiments or figures with reference to which they are described. The present disclosure is thus neither a literal description of all embodiments of the invention nor a listing of features of the invention that must be present in all embodiments.

The invention may be embodied in other specific forms without departing from the spirit or essential characteristics thereof The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A system for printing instant, scratch-off lottery game tickets on-demand, comprising:
    a remote central host comprising at least one processor and memory storing instructions operable by the at least one processor to generate ticket game data for at least one lottery ticket; and
    at least one device communicatively coupled to the remote central host, with the at least one device comprising a thermal printer adapted to apply game data on a partially completed ticket which has at least one security coating previously applied thereto, with the at least one device further comprising a ticket input component and a ticket output component, and being configured to receive the partially completed ticket from a user from outside of the at least one device via the ticket input component, read a game identification element associated with the received partially completed ticket, send code information corresponding to the game identification element to the remote central host, receive instructions from the remote central host specifying the ticket game data to be applied to the partially completed ticket, and apply the ticket game data at least partially under the at least one security coating on the partially completed ticket to complete the ticket for game play.

2. The system of claim 1, wherein the instructions specify a location in which to print the ticket game data on the partially completed ticket according to the game identification element.

3. The system of claim 1, wherein the partially completed ticket contains no security code and no game data.

4. The system of claim 1, wherein the partially completed ticket is partially completed before being received by the at least one device, such that the partially completed ticket includes a ticket substrate having a top face, and at least a plurality of coatings applied to the top face, including a thermally sensitive coating, an adhesion enhancement coating, at least one release agent coating, the at least one security coating, a plurality of color layers and an overprint varnish layer.

5. The system of claim 1, wherein the partially completed ticket is further partially completed before being received by the at least one device, such that the partially completed ticket includes a ticket substrate having a back face including an anti-curl clear coating.

6. The system of claim 1, wherein the ticket input component comprises a slot.

7. The system of claim 1, wherein the partially completed ticket is not sufficiently completed for game play.

8. The system of claim 1, wherein the thermal printer applies the ticket game data with no ink.

9. A lottery ticket vending device, comprising:
    a cabinet, comprising a ticket input slot;
    a ticket printing component secured within the cabinet;
    at least one processor; and
    a memory storing instructions that, when executed by the at least one processor, cause the at least one processor to perform operations comprising:
        transmit code information to a remote central host, wherein the code information corresponds to a game identification element read from a partially completed ticket inserted into the cabinet from outside of the cabinet via the ticket input slot,
        receive instructions from the remote central host specifying ticket game data to be applied to the partially completed ticket, and
        instruct the ticket printing component to apply the ticket game data specified by the received instructions to the partially completed ticket inserted into the cabinet to complete the ticket for game play.

10. The lottery ticket vending device of claim 9, wherein the partially completed ticket has no game data and is not sufficiently completed for game play.

11. The lottery ticket vending device of claim 9, wherein the partially completed ticket comprises at least one security coating, and wherein the ticket printing component applies the ticket game data at least partially under the at least one security coating on the partially completed ticket.

12. The lottery ticket vending device of claim 11, wherein the ticket printing component comprises a thermal printer and applies the ticket game data with no ink.

13. The lottery ticket vending device of claim 9, further comprising at least one input device for receiving a ticket option selection from a user.

14. The lottery ticket vending device of claim 13, wherein the at least one input device is a camera, and the ticket option selection is a photograph using the camera, and further wherein the ticket printing component prints the photograph taken by the camera on the partially completed ticket.

15. The lottery ticket vending device of claim 13, wherein the ticket option selection is a customization option comprising a personalized message, and further wherein the ticket printing component prints the personalized message on the partially completed ticket.

16. The lottery ticket vending device of claim 13, wherein the ticket option selection is a customization option comprising a customization code, and wherein the instructions cause the at least one processor to perform further operations comprising reading the customization code and customizing the partially completed ticket.

17. A method for printing instant, scratch-off lottery game tickets on-demand, comprising:
    receiving, by a lottery ticket vending device comprising a cabinet with a ticket input slot, a partially completed ticket through the ticket input slot, wherein the partially completed ticket has a game identification element and is not sufficiently completed for game play;
    reading, by the lottery ticket vending device, the game identification element from the partially completed ticket;
    transmitting, by the lottery ticket vending device to a remote central host, code information corresponding to the game identification element;
    receiving, by the lottery ticket vending device from the remote central host, instructions specifying ticket game data to be applied to the partially completed ticket; and
    applying, by a ticket printing component maintained with the lottery ticket vending device, the ticket game data specified by the received instructions to the partially completed ticket to complete the ticket for play.

18. The method of claim 17, wherein the partially completed ticket comprises at least one security coating, and wherein the ticket printing component applies the ticket game data at least partially under the at least one security coating on the partially completed ticket.

19. The method of claim 17, wherein the ticket printing component comprises a thermal printer and applies the ticket game data with no ink.

\* \* \* \* \*